Sept. 4, 1962    W. J. SCAVUZZO    3,052,206
INDICATOR DEVICE
Filed Nov. 29, 1960
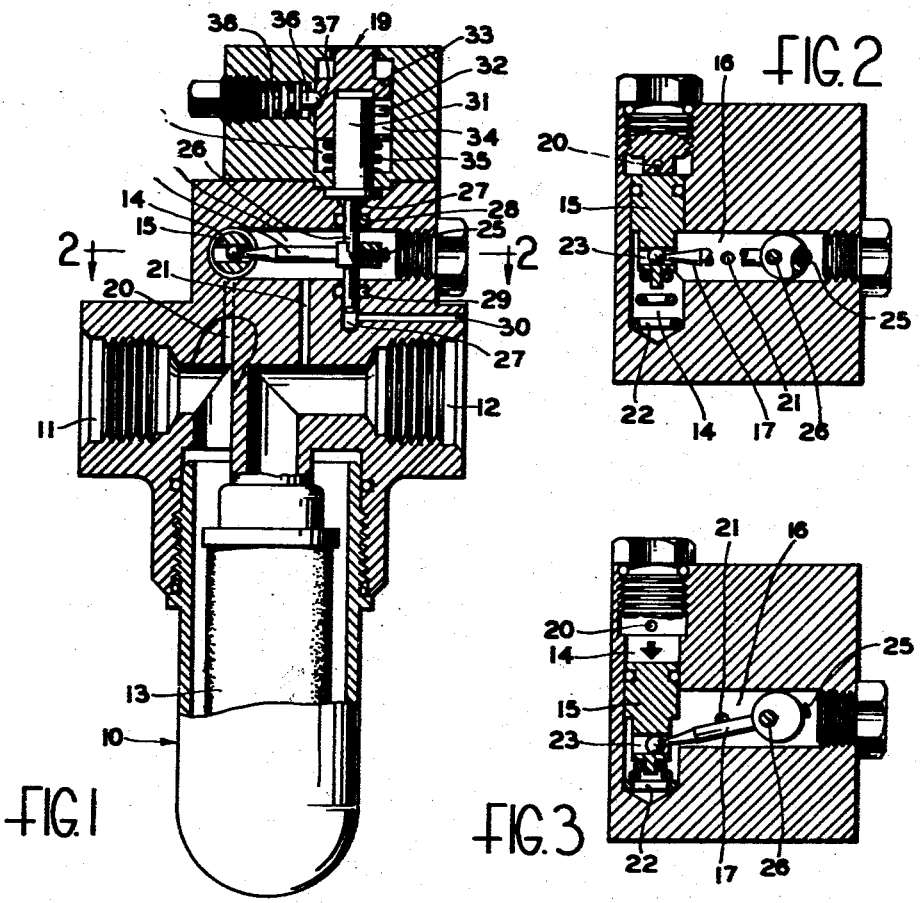
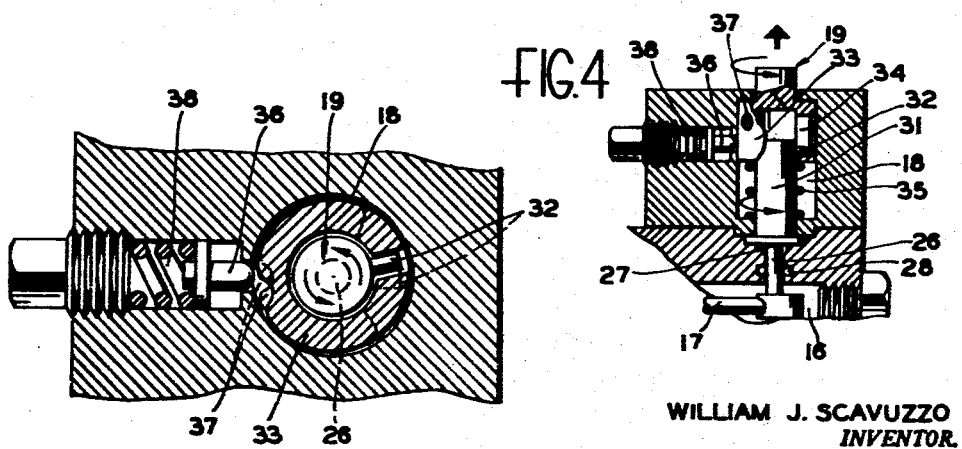
WILLIAM J. SCAVUZZO
INVENTOR.
BY *Lawrence J. Winter*
ATTORNEY United States Patent Office 3,052,206
Patented Sept. 4, 1962

3,052,206
INDICATOR DEVICE
William J. Scavuzzo, Clark, N.J., assignor to Purolator Products, Inc., Rahway, N.J., a corporation of Delaware
Filed Nov. 29, 1960, Ser. No. 72,445
8 Claims. (Cl. 116—70)

The present invention relates to an indicator device for visibly indicating when a filter has become clogged, and more particularly, to indicating when a filter has become clogged due to an increase in the differential pressure across the filter.

An object of the present invention is to provide an indicator device in which the linear motion of a differential pressure-sensing piston is converted to rotary motion through lever means operatively connected to an actuator rod which releases a poppet member to a signalling position when the filter is clogged.

Another object of the present invention is to provide a differential pressure-sensing piston operatively connected to a lever which transmits linear motion to a rotary rod that releases a poppet signal member wherein the rod extends outside the liquid chamber and communicates with the atmosphere at both ends, so that any change in the operating pressure of the liquid passing through the filter element will not affect operation of the indicator device.

Another object of the present invention is to provide a differential pressure-sensing piston for use with a filter presenting equal areas against which the upstream and downstream liquid pressures act and a rod operatively connected thereto and extending outside the liquid chamber so that any changes in the high liquid pressure flowing through the filter will not cause an unbalanced force on the rod.

Various other objects and advantages of the present invention will become readily apparent from the following detailed description when considered in connection with the accompanying drawings forming a part thereof, and in which:

FIG. 1 is a side elevational view in section taken through the lever bore, illustrating the indicator device used with a filter element;

FIG. 2 is a sectional plan view of the indicator device shown in FIG. 1 taken along lines 2—2 with the lever arm and other portions broken away to more clearly illustrate the invention, and when the differential pressure across the piston is below a predetermined value;

FIG. 3 is a plan view similar to FIG. 2, showing the position of the piston when the differential pressure across the piston exceeds a predetermined value with the lever means disposed in a position where the indicator poppet is in a signalling position.

FIG. 4 is a fragmentary view of the indicator poppet shown in FIG. 1 in a signalling position; and FIG. 5 is an enlarged fragmentary top plan view partly in section of the indicator poppet of FIG. 4 being reset into a non-signalling position.

Referring to the drawings, the reference numeral 10 generally designates a filter casing or housing having an oil inlet 11 and an outlet 12 and a filter element 13 disposed therein. Inlet 11 communicates with the upstream side of the filter while outlet 12 communicates with the downstream side. The upper portion of the casing is provided with a horizontal piston bore 14 (see FIG. 2) in which is disposed a piston 15. A second horizontal lever bore 16 (see FIGS. 1, 2) is connected to piston bore 14 at approximately its center and in the same plane. A connecting lever or arm 17 is disposed in bore 16. A third bore 18 is vertically disposed in the housing above and in alignment with the lever bore 16 and has an indicator poppet member 19 therein.

Liquid oil pressure on the upstream side of the filter element is transmitted to the rear side of piston 15 through a small passage 20 extending between inlet 11 and bore 14 (see FIGS. 1, 2, 3). Liquid oil pressure on the downstream side of the filter is transmitted to the front end of the piston through small passage 21 extending between outlet 12 and lever bore 16 (see FIGS. 1, 2). Passage 20 is located toward the rear of the housing, while passage 21 is out of alignment with passage 20 and toward the front of the housing.

The differential pressure-sensing piston is normally positioned adjacent the rear of bore 14, as in FIG. 2, when the filter is operating normally and is not clogged. A compression spring 22 in the front end of the bore normally maintains the piston adjacent the rear of the bore. The areas on both ends of the piston are substantially equal, so that the piston will accurately sense the differential pressure existing between inlet and outlet ports 11 and 12. As long as the differential pressure between the inlet and outlet ports remains below a predetermined value, determined by the spring load of spring 22, the piston member will not move. When the differential pressure is such that the spring load is overcome, the piston will move toward the front end of the bore, as illustrated in FIG. 3. The differential pressure above the predetermined value generally results because of a clogged filter element.

Piston 15 has a slot 23 extending through it into which extends the free end of connecting lever 17. The opposite end of the lever has an opening in it for inserting a rod 26 therethrough, and a set screw 25 which fixes the lever to the rod so there is no relative movement between them.

Rod 26 is disposed in the housing so its upper end extends into the poppet bore 18 (FIG. 1) while its lower end extends into a passage or small bore 27 below lever bore 17 (FIG. 1). O-ring seals 28 and 29 located around the rod above and below the lever bore prevent any oil from leaking out of the bore. An atmospheric vent passage 30 (FIG. 1) communicates with the lower end of passage 27, while the upper end of the rod communicates with the atmosphere through the poppet bore. Both ends of the rod communicate with the atmosphere and have O-ring seals 28 and 29 sealing leakage of oil around the rod to balance the rod with the oil pressure in the piston and lever bores, and balance the rod with the atmospheric pressure.

Thus, should the operating pressure of the oil flowing through the filter be changed for 2,000 p.s.i. to 3,000 p.s.i. for example, since the rod does not have an end terminating in the lever chamber, there is no excessive force due to this increase in pressure, acting to push the indicator rod out of the housing through the poppet bore.

The upper end of the rod is provided with a cylindrical portion 31 with an outwardly extending projection on key 32 thereon. A flange on the lower end of portion 31 prevents axial movement of the rod. The poppet signal member 19 consists of a hollow sleeve 33 which fits over the cylindrical portion 31, as seen in FIG. 1. Projection 32 extends into a vertical slot 34 in the poppet sleeve 33 so that there can be no rotational movement between the poppet member and rod. A compression spring 35 is disposed in the bottom of bore 18 and normally urges the poppet signal member toward a signalling position above the housing. A pin detent 36 disposed in the housing projects into a recess 37 in the sidewall of poppet sleeve 33. A biasing spring 38 holds the pin in the poppet recess to prevent upward movement of the poppet member into a signal position, until the poppet member has been rotated to disengage it from the detent 36.

In operation, when oil is passed through the filter and the filter is not clogged, the piston 15 is disposed in the position shown in FIG. 2 adjacent one end of the piston bore, with the lever arm 17 in a position substantially at right angles to the piston. The detent 36 is engaged in recess 37 of the poppet member and the poppet member is in a hidden position below the end of the housing.

When the filter becomes clogged and the differential pressure across the filter element exceeds the force in compression spring 22 holding the piston adjacent the rear of the bore, the excess pressure causes the piston to overcome the force in the spring and move toward the front end of the cylinder, to the position shown in FIG. 3. Linear movement of the piston causes the lever arm 17 to be rotated or angularly displaced. Since rod 26 is fixedly connected to the lever arm, it too is rotated in the direction indicated by the arrow in FIG. 4. This causes key 32 on the rod to rotate the poppet member in the direction indicated by the arrows shown in FIG. 5, so that the detent pin 36 is disengaged from the recess 37, thereby permitting the biasing spring 35 to cause the poppet member to move to the visible position shown in FIG. 4 above the housing to indicate that the filter is clogged.

Thus, the present invention provides a novel pressure-sensing piston in which linear motion of the piston is transmitted through a lever to rotate a rod which releases the signal member.

Inasmuch as various changes may be made in the form, location and relative arrangement of the several parts without departing from the essential characteristics of the invention, it will be understood that the invention is not to be limited except by the scope of the appended claims.

What is claimed is:

1. An indicator device for use with a clogged filter comprising a housing with a chamber therein, a slidable piston member in said chamber for sensing the differential pressure across a filter, first passage means communicating with one side of said piston member and the upstream side of said filter, second passage means communicating with the opposite side of said piston member and the downstream side of said filter, means maintaining said piston member adjacent one end of said chamber when the differential pressure is below a predetermined value, rotatable actuating means in said housing operatively connected to said piston member for rotation thereby when the differential pressure across said piston member exceeds a predetermined value, means for equalizing and balancing the pressure interior of and exterior of said housing on said actuating means, and signal means operatively connected to said actuating means adapted to move to a signal position when the differential pressure across said piston member exceeds a predetermined value.

2. An indicator device for use with a clogged filter comprising a housing with a chamber therein, a slidable piston member in said chamber for sensing the differential pressure across a filter, first passage means communicating with one side of said piston member and the upstream side of said filter, second passage means communicating with the opposite side of said piston member and the downstream side of said filter, means maintaining said piston member adjacent one end of said chamber when the differential pressure is below a predetermined value, actuating rod means disposed in said housing for rotation by said piston member when the differential pressure across said piston member exceeds a predetermined value, lever means connected between said actuating means and said piston member for translating linear motion of the piston member into rotary movement of the actuating means, means for equalizing and balancing the pressure interior of and exterior of said housing on said actuating means, and signal means operatively connected to said actuating rod means adapted to move to a signal position when the differential pressure across said piston member exceeds a predetermined value.

3. An indicator device for use with a clogged filter comprising a housing with a chamber therein, a slidable piston member having a slot therein in said chamber for sensing the differential pressure across a filter, first passage means communicating with one side of said piston member and the upstream side of said filter, second passage means communicating with the opposite side of said piston member and the downstream side of said filter, means maintaining the piston member adjacent one end of said chamber when the differential pressure is below a predetermined value, a rotatable actuating rod disposed in said housing out of alignment with said piston member for rotation thereby when the differential pressure across said piston member exceeds a predetermined value, a lever arm having one end fixed to said rod for rotation thereof and the other end disposed in said slot for movement by said piston member, the opposite ends of said rod being in communication with the housing exterior for equalizing and balancing the pressure interior of and exterior of said housing on said actuating means, and signal means operatively connected to said actuating rod means for moving to a signal position when the differential pressure across said piston member exceeds a predetermined value, and means preventing said signal means from moving to a signal position when the differential pressure across said piston member is below said predetermined value.

4. A pressure indicator for use with a filter comprising a housing having a piston bore, a lever bore and a poppet bore therein, a slidable piston disposed in said piston bore for measuring the differential pressure across the filter, first passage means communicating with one side of said piston member and the upstream side of said filter, second passage means communicating with the opposite side of said piston member and the downstream side of said filter, means maintaining the piston adjacent one end of said piston bore when the differential pressure is below a predetermined value, a rotatable rod in said lever bore having its ends extending outside said lever bore and in communication with the atmosphere, a lever arm, one end of said lever arm being fixed to said rod for rotational movement thereof and the opposite end of said lever arm operatively connected to said piston for angular displacement thereby, a poppet member in said poppet bore connected to said rod for rotation therewith for moving it to a signal position, means normally urging said signal member toward a signalling position, and locking means operatively connected to said poppet member to prevent it from moving to a signal position when the differential pressure across said piston is below a predetermined value.

5. A pressure indicator device for use with a filter comprising a housing having a horizontal piston bore and a lever bore disposed in the side of said piston bore, and a signal member bore disposed above said lever bore, a pressure-sensing piston in said piston bore for measuring the differential pressure across the filter, first passage means communicating with one side of said piston member and the upstream side of said filter, second passage means communicating with the opposite side of said piston member and the downstream side of said filter, means maintaining said piston adjacent one end of its bore when the differential pressure across said piston is below a predetermined value, a lever arm in said lever bore having one end operatively connected to said piston for movement therewith, a rotatable rod in said housing extending through said lever bore and having its opposite ends in communication with the exterior of the housing, the other end of the lever arm being fixed to said rod for rotation thereof when the differential pressure across said piston exceeds a predetermined value, a signal member in said poppet bore operatively connected to said rod for rotation thereby, means urging said signal member above the housing, and locking means preventing movement of said signal member above the housing until said rod is rotated.

6. A differential pressure indicating device for use with a filter comprising a housing having first, second and third bores therein, a piston located in said first bore for measuring the differential pressure across the filter, a first port means adapted to communicate with one side of the piston and the upstream side of a filter, a second port means adapted to communicate with said second bore and the other side of said piston and the downstream side of a filter, means maintaining said piston adjacent one end of said first bore when the differential pressure across the piston is below a predetermined value, a rotatable rod extending through said second bore and having its opposite ends in communication with the exterior of the housing, a lever arm in said second bore having one end fixed to said rod and the other end operatively connected to said piston for converting linear movement of said piston to rotary motion of the rod when the differential pressure across said piston exceeds a predetermined value, a signal member in said third bore fixed to said rod for rotation thereby, means urging said signal member toward a signal position above the housing, and locking means preventing movement of said signal member above the housing until said rod is rotated.

7. The pressure indicating device of claim 6 wherein the first bore is a horizontal bore, the second bore is disposed in the side of said first bore, and the third bore is disposed above said second bore and in alignment therewith.

8. A differential pressure indicating device for use with a filter comprising a housing having a horizontal piston bore with a piston therein, passage means adapted to communicate the opposite ends of the piston with the upstream and downstream sides of a filter to sense the differential pressure across a filter, biasing means normally maintaining said piston adjacent one end of the bore when the differential pressure is below a predetermined value, said housing having a lever bore disposed in the side of said piston bore, a rotatable rod extending through said lever bore and having its opposite ends in communication with the exterior of the housing, said piston having a slot therein, a lever arm in said lever bore having one end fixed to said rod and the other end extending into said slot for rotation of said indicator rod upon linear movement of said piston when the differential pressure across the filter exceeds a predetermined value, said housing having a poppet bore disposed above and in alignment with said lever bore, a signal member in said poppet bore fixed to the rod for rotation thereby, other biasing means urging said signal member toward a signal position above the housing, and detent means preventing movement of said signal member above the housing until said rod is rotated through a predetermined angle by said piston.

References Cited in the file of this patent

UNITED STATES PATENTS 2,843,077     Leefer _____ July 15, 1958